(12) United States Patent
Tamir

(10) Patent No.: US 10,511,160 B1
(45) Date of Patent: Dec. 17, 2019

(54) DETECTION AND PROTECTION OF POWER PHASE LOSS AND NEUTRAL FAILURE

(71) Applicant: Oren Tamir, Raanana (IL)

(72) Inventor: Oren Tamir, Raanana (IL)

( * ) Notice: Subject to any disclaimer, the term of this patent is extended or adjusted under 35 U.S.C. 154(b) by 0 days.

(21) Appl. No.: 16/281,659

(22) Filed: Feb. 21, 2019

(51) Int. Cl.
  *H02H 3/33* (2006.01)
  *H02H 9/04* (2006.01)
  *H02H 3/16* (2006.01)
  *H02H 3/34* (2006.01)
  *H02H 3/253* (2006.01)

(52) U.S. Cl.
  CPC .............. *H02H 3/338* (2013.01); *H02H 3/16* (2013.01); *H02H 3/253* (2013.01); *H02H 3/34* (2013.01); *H02H 9/042* (2013.01)

(58) Field of Classification Search
  CPC ........ H02H 3/338; H02H 9/042; H02H 3/253; H02H 3/34

USPC ...................................................... 361/1, 91.1
See application file for complete search history.

(56) References Cited

U.S. PATENT DOCUMENTS

2014/0168830 A1\* 6/2014 Vangool ................. H01H 83/04
                                                            361/47

\* cited by examiner

*Primary Examiner* — Dharti H Patel
(74) *Attorney, Agent, or Firm* — Browdy and Neimark, P.L.L.C.

(57) ABSTRACT

A protection circuit provides a control voltage to a 3-phase contactor, where the three phases of the 3-phase power supply are inputs to the 3-phase contactor. The protection circuit includes: four input terminals, configured to be connected respectively to the three phases and to the neutral line of the 3-phase power supply; an output terminal, providing the control voltage to a control line of the 3-phase contactor; and control circuitry configured to provide the control voltage when any one or more of the three phases are live and when the neutral line is connected, and to provide no control voltage when all three phases are disconnected or when the neutral line is disconnected.

14 Claims, 22 Drawing Sheets

DETECTION AND PROTECTION OF POWER PHASE LOSS AND NEUTRAL FAILURE

FIELD OF THE INVENTION

The present invention generally relates to power grid operation and specifically to protection of three-phase circuits.

BACKGROUND

Neutral failure in a three phase power supply can be very dangerous and can also ruin valuable equipment. There are many causes of neutral failure. These include: bushing failure or neutral line breakage at the 3-phase distribution transformer, a broken neutral on an overhead distribution line, a broken service neutral conductor, a high ground resistance at the distribution transformer, the sharing of neutrals in a poorly wired building, overloading and unbalanced distribution, and, in general poor maintenance, such as inadequate tightening of connectors.

SUMMARY

The present invention provides a system and methods for switching between phases of a three phase power supply to provide a control voltage to a 3-phase contactor and to switch off the 3-phase contactor if the neutral line is floating. There is therefore provided, by embodiments of the present invention, a protection circuit that provides a control voltage to a 3-phase contactor, wherein the three phases of the 3-phase power supply are inputs to the 3-phase contactor, the protection circuit comprising: four input terminals, configured to be connected respectively to the three phases and to the neutral line of the 3-phase power supply; an output terminal, providing the control voltage to a control line of the 3-phase contactor; and control circuitry configured to provide a control voltage to the control line when any one or more of the three phases are live and when the neutral line is connected, and to provide no control voltage when the neutral line is floating.

There is also provided a neutral protection circuit, for detecting neutral loss of a phase of a three-phase power source, comprising: at least two relay circuits, connected to powers source of three phases; a contactor connected A1 point to at least one relay circuit; and the A2 point connected to neutral and a capacitor connected between A1 and A2 contacts of the contactor.

Optionally at least one fuse is between the contactor and one relay circuit for protecting the relays. In case A1 in Cmain receives at least one phase, and A2 receive N, the Cmain is closed and all three phases can work regularly. In case neutral failure, the Cmain is in disconnection state, protecting the output of the three phases, by disconnecting at least one phases.

The present invention provides a protection circuit providing a control voltage to a 3-phase contactor, wherein the three phases of the 3-phase power supply are inputs to the 3-phase contactor, the protection circuit comprising:

four input terminals, configured to be connected respectively to the three phases and to the neutral line of the 3-phase power supply;

an output terminal, providing the control voltage to a control line of the 3-phase contactor; and control circuitry configured to provide a control voltage to the control line when any one or more of the three phases are live and when the neutral line is connected, and to provide no control voltage when the neutral line is floating.

According to embodiments of the present invention the control circuitry is comprised of: at least two cross-connected relays, wherein each relay includes at least one normally open connection and at least one normally close connection, and wherein the output of the at least two cross-connected relays provides a single phase voltage as the control voltage when any one of the three phases is disconnected.

According to embodiments of the present invention the control circuitry is comprised of elements including a summing circuit providing a voltage average of the three phases, a filter circuit, a power supply providing a reference voltage, and a comparison circuit comparing the reference voltage to the voltage average.

According to embodiments of the present invention the circuit further comprise at least one fuse connecting between A1 point and at least one relay According to embodiments of the present invention the circuit further comprise at least one cutoff circuit which is bridging at least one relay to the contactor between points A2 at the contactor and point A2 at one relay to provide protection in case of over-voltages or under-voltages.

According to embodiments of the present invention the control circuit further comprise a third relay circuit.

According to embodiments of the present invention the control circuit further comprise residual-current device Residual-current device (RCD) is connected to the 3-phase contactor in a feedback loop where one of the phases RCD_R, RCD_S or RCD_T are bridged to the 3-phase contactor.

According to embodiments of the present invention control circuit is comprised of DC power unit, switching unit and micro controller 34 providing one phase to Cmain circuit.

According to embodiments of the present invention the circuit further comprising a communication unit to sending indication of neutral loss to a power electricity facility, The present invention provides a protection circuit connecting three loads to three respective phases of a 3-phase power supply comprises:

four input terminals, configured to be connected respectively to the three phases and to the neutral line of the 3-phase power supply;

a three-phase contactor, having a control line and three input terminals connected to the three phases of the 3-phase power supply; and control circuitry configured to provide a control voltage to the control line when any one or more of the three phases are live and when the neutral line is connected, and to provide no control voltage when the neutral line is floating.

BRIEF DESCRIPTION OF DRAWINGS

In the following detailed description of various embodiments, reference is made to the following drawings that form a part thereof, and in which are shown by way of illustration specific embodiments by which the invention may be practiced, wherein:

FIGS. 1-A, 1-B and 1-C illustrate typical switching scenarios of the circuit in FIG. 1.

FIGS. 2-A, 2-B and 2-C illustrate typical switching scenarios of the circuit in FIG. 2.

DETAILED DESCRIPTION OF THE INVENTION

In the following detailed description of various embodiments, it is understood that other embodiments may be utilized and structural changes may be made without departing from the scope of the present invention.

A neutral protection circuit, for detecting neutral loss of a phase of a three-phase power source, comprising:

at least two relay circuits, connected to powers source of three phases;

a contactor connected A1 point to at least one relay circuit; and connected on A2 point to neutral and a capacitor connected between A1 and A2 contacts of the contactor Optionally at least one fuse between the contactor and one relay circuit for protecting the relays. Optionally a second fuse between the two relay circuits for protecting the relays wherein In case A1 in Cmain receives at least one phase, and A2 receive N, the Cmain is closed (connected state) and all three phases can work regularly. In case neutral failure, the Cmain is in disconnection state, protecting the output of the three phases, by disconnecting at least one phases.

Figure 1:
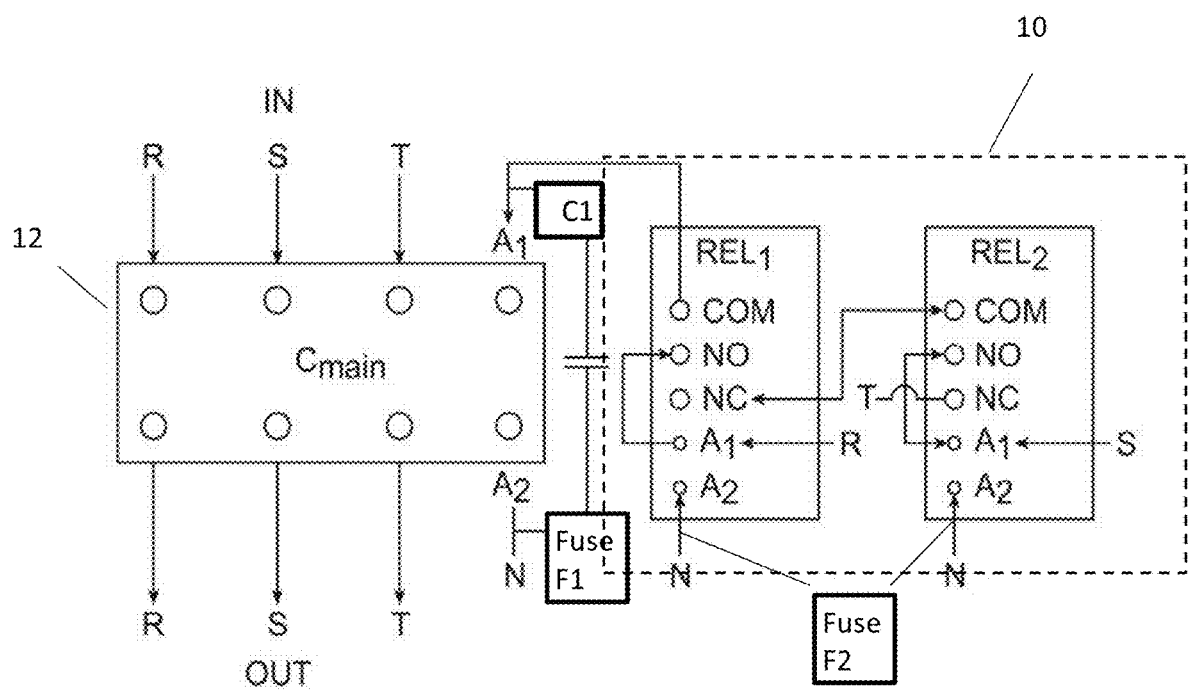
FIG. 1 is a schematic illustration of a three-phase protection circuit including a contactor, two relays, a fuse and a capacitor in accordance with an embodiment of the present invention.
Figure 1A:
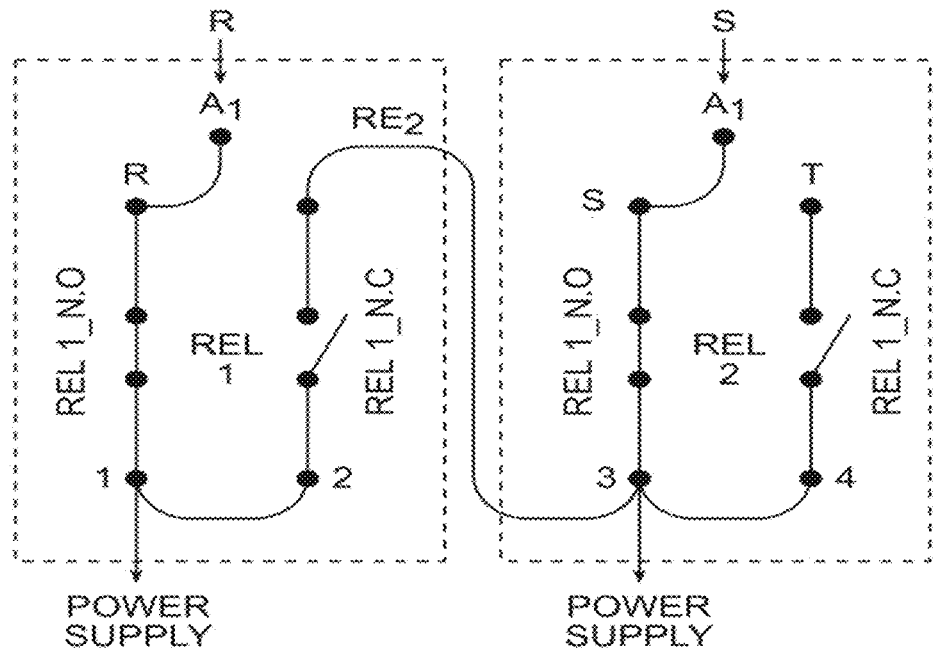
FIG. 1D is a schematic illustration of a three-phase protection circuit including a contactor, two relays, and a capacitor in accordance with an embodiment of the present invention.
FIG. 1E is a schematic illustration of a three-phase electrical power system including a protection circuit for a load powered by a 3-phase power source, the system including a contactor, two relays, three fuses and a capacitor in accordance with an embodiment of the present invention.
Figure 1B:
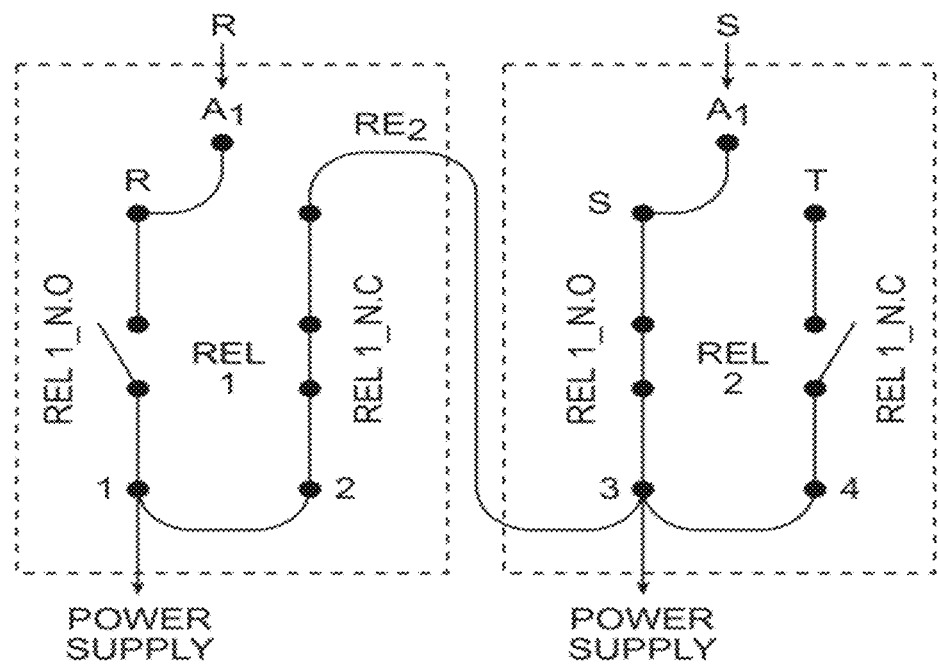
Figure 1C:
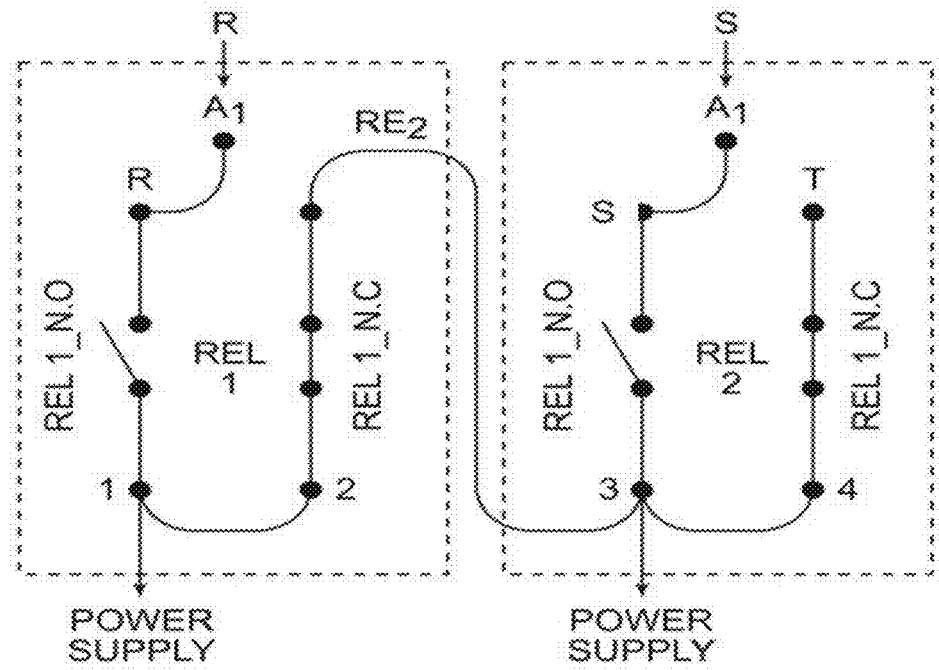

FIG. 1 is a schematic illustration of a three-phase electrical power system including a neutral loos detection circuit and its wirings for detecting and control circuit 10 for providing at least one live phase input. (The control circuitry configured to provide a control voltage to the control line when any one or more of the three phases are live). The control circuit 10 receives, as input, three-phase input power, typically with a four-wire configuration that includes a neutral line, as indicated in the figure. The phases of the three-phase power input are commonly labelled R, S, and T phases, respectively. The three-phase power input is typically provided by an electric generator, such as an on-site generator or a generator of a utility grid. Also provided with the three phases, in normal operation, is a neutral line, indicated as N.

In embodiments of the present invention, the control circuit 10 includes two relays labelled Rel1, Rel2, and contactor Cmain 12 at NO status, Fuse F1, Fuse F2 and a capacitor C1 as illustrated in FIG. 1. The phase inputs to Contactor Cmain 12 are labelled as InR, InS and InT. The phase outputs from contactor Cmain are labelled as OutR, OutS and OutT. The coil terminals are marked as Cmain_A1 and Cmain_A2. The common neutral line is marked N. There are few scenarios available in the present invention. This configuration protects in case of neutral loss the contactor is not activated.

In case A1 in Cmain 12 receives at least one phase, S, R or T, and A2 receive N, the Cmain is closed (connected state) and all three phases can work regularly. In case of neutral failure, the Cmain is in a disconnection state, protecting the output of the three phases, by disconnecting all three phases.

In the scenario in FIG. 1, Cmain_A2, Rel1 and Rel2 are connected to N.

Fuse F1 is bridging Cmain_A1 and Rel_A1. F1 is used as a circuit protection against spikes as well as an indicator for possible problems.

Capacitor C1 is bridging between Rel1_com, Cmain_A1 and Cmain_A2 and Rel1_A2. C1 is used a circuit protection against spikes when switching between phases.

Rel1_N.O is connected to Rel1_A1 and Rel2_com.

Rel1_N.C is connected to InT.

Rel1_A1 is connected to Rel1_N.O and to Rel2_com.

Rel2 is wired as follows:

Rel2_com is connected to Rel1_N.O; Rel2_N.O is connected to InR; Rel2_N.C is connected to InS; Rel2_A1 is connected to InR.

In the event of loss of one or two of the phases, the circuit switches a backup phase from the other existing phases to provide single live phase. Capacitor C1 is bridging Cmain_A1 and Cmain_A2 to protect Cmain as well as Rel1 and Rel2 from current spikes during switching events.

There are several scenarios are relevant and possible:

Scenario A: at default when all phases and common neutral line function well as illustrated in FIG. 1-A. Rel2.N.C is disconnected; Rel2.N.O is connected; Rel1.N.C is connected; Rel1.N.O is disconnected. A power supply receives phase R.

Scenario B: R line fails or missing—Rel2 switches due to the voltage drop as illustrated in FIG. 1-B While Rel1 does not. Rel2.N.C is disconnected; Rel2.N.O is connected; Rel1.N.C is connected; Rel1.N.O is disconnected. A power supply receives phase S.

Scenario C: R, S line fail, as illustrated in FIG. 1-C. Rel1 opens and switching is as such Rel2.N.C is connect; Rel2.N.O is disconnected; Rel1.N.C is connected; Rel1.N.O is disconnected; Rel2 switches due to the voltage drop from Rel1 and Rel1 switches due to the voltage drop from R and S lines. A power supply receives phase T.

Figure 1D:
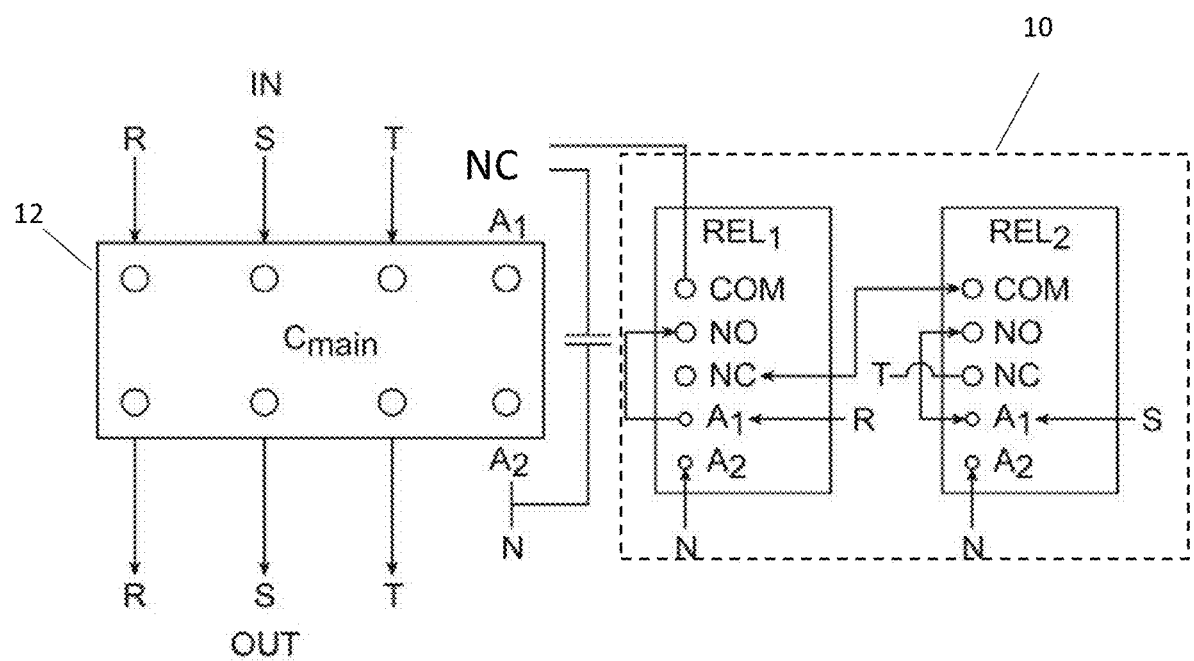

FIG. 1D is a schematic illustration of a three-phase electrical power system including a protection circuit for a load powered by a 3-phase power source, the system including a contactor 12 and control circuit 10 which is comprised of: two relays, and a capacitor in accordance with an embodiment of the present invention In case A1 in Cmain receives at least one phase, S, R or T, and A2 receive N, the Cmain is closed (connected state) and all three phases can work regularly. In case of neutral failure, the Cmain is in disconnection state, protecting the output of the three phases, by disconnecting all three phases.

In scenario in FIG. 1D, Cmain_A2, Rel1 and Rel2 are connected to T.

In case phase T is lost, one of the phases R or S is conveyed through Rel1 or Rel2, in each case one of Rel1 or Rel2 connect A1 to A2 in connector Cmain.

Figure 1E:
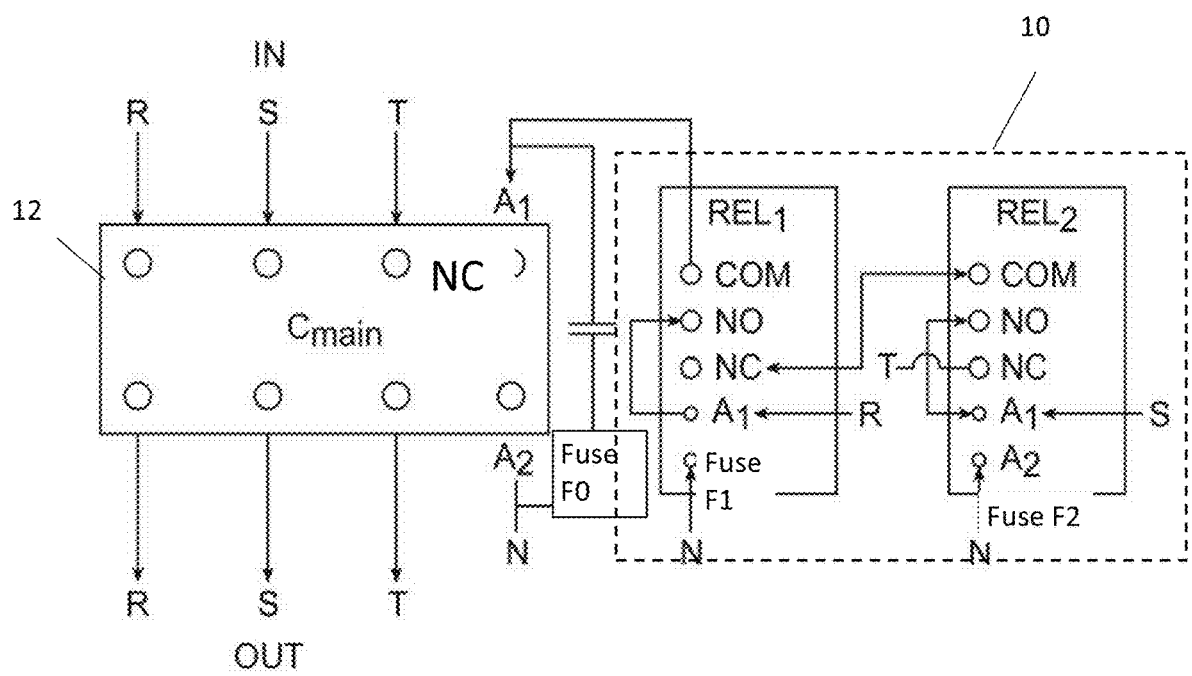

FIG. 1E is a schematic illustration of a three-phase electrical power system including a protection circuit for a load that is powered by a 3-phase power source, the system including a contactor and control circuit comprised of: two relays, three fuses and a capacitor, in accordance with an embodiment of the present invention. Each neutral line connection to the relays and the contactor is protected by a fuse.

In case A1 in Cmain receives at least one phase, S, R or T, and A2 receive N, the Cmain is closed (connected state) and all three phases can work regularly. In case of neutral failure, the Cmain is in disconnection state, protecting the output of the three phases, by disconnecting all three phases.

Figure 2:
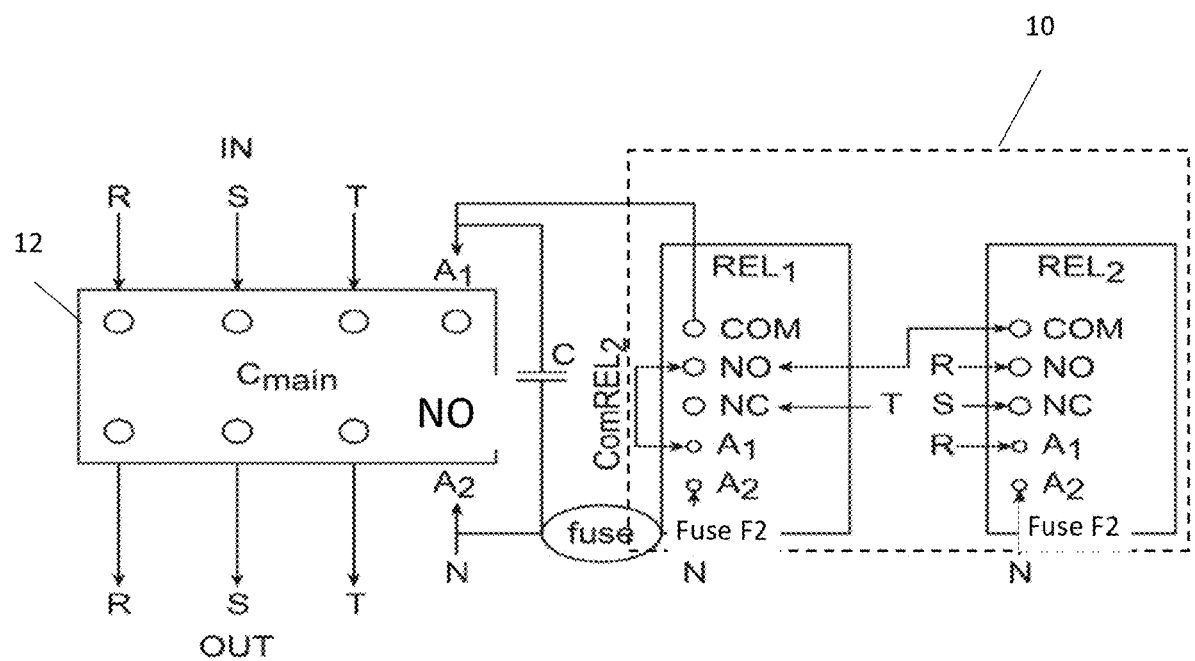
FIG. 2 is a schematic illustration of a three-phase protection circuit including a contactor, two relays, a fuse and a capacitor in accordance with an embodiment of the present invention.
Figure 2A:
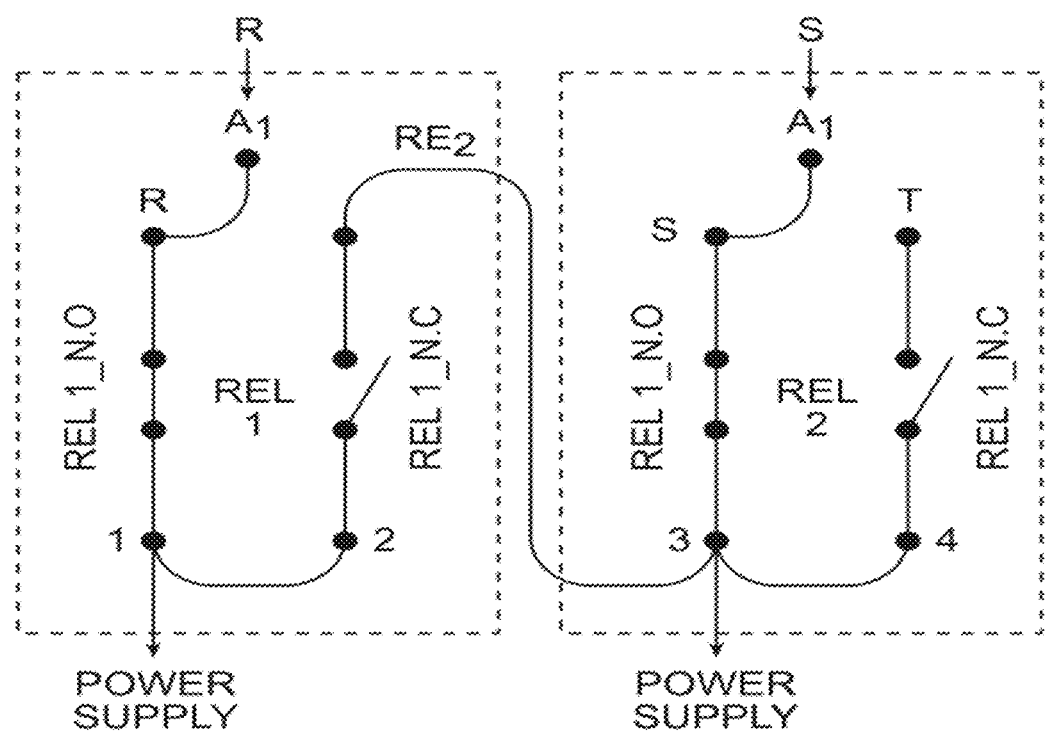
Figure 2B:
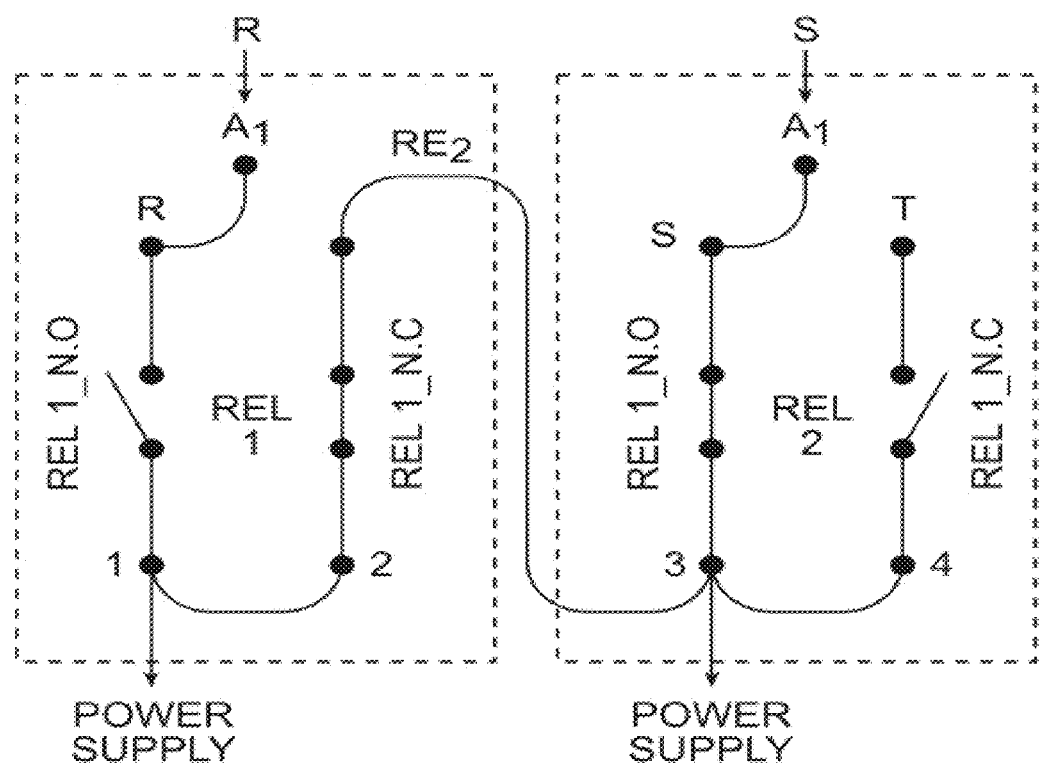
Figure 2C:
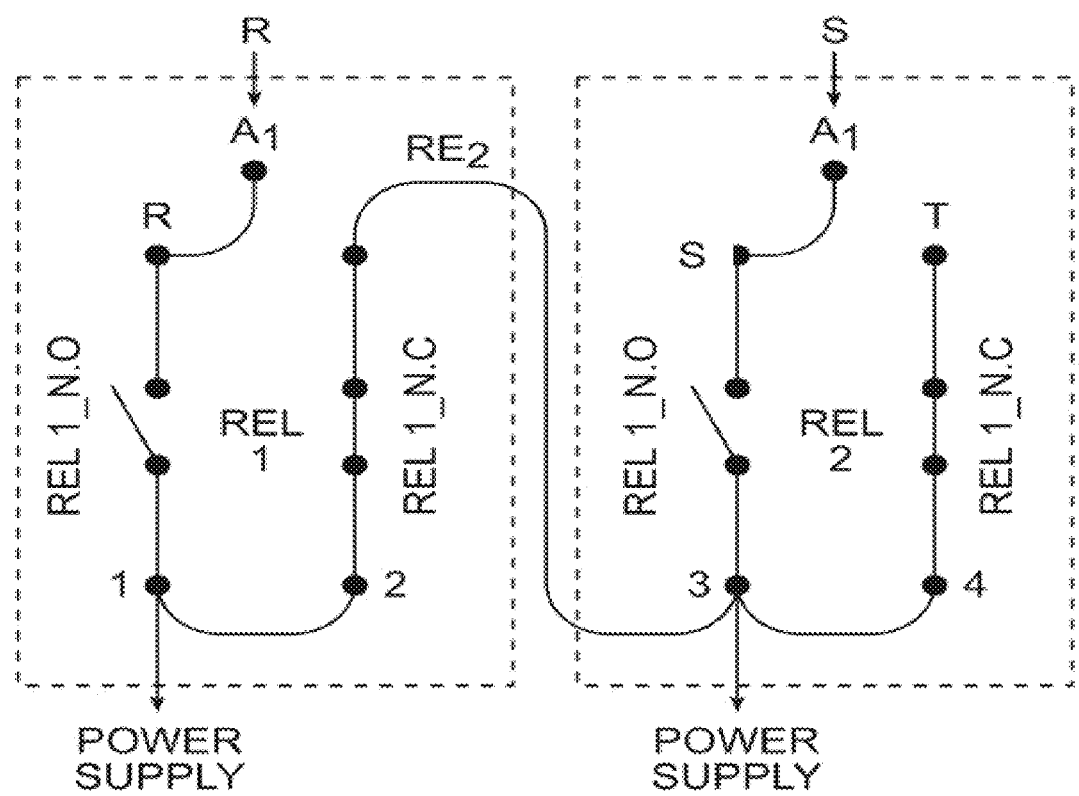

FIG. 2 is a schematic illustration of an alternative configuration of a three-phase electrical power system including a control circuitry for providing a single live phase from three phase input, in accordance with an embodiment of the present invention. The control circuitry configured to provide a control voltage to the control line when any one or more of the three phases are live. The control circuitry receives, as input, three-phase input power, typically with a four-wire configuration that includes a neutral line, as indicated in the FIG. 1. The phases of the three-phase power input are commonly labelled R, S, and T phases, respectively. The three-phase power input is typically provided by an electric generator, such as an on-site generator or a generator of a utility grid.

In case A1 in Cmain receives phase, S, R or T, and A2 receive N, the Cmain is closed and all three phases can work regularly. In case of neutral failure, the Cmain is in disconnection state, protecting the output of the three phases, by disconnecting all three phases.

In scenario in FIG. 2-A, Cmain_A2, Rel1 and Rel2 are connected to N.

Rel1_com is connected to Cmain_A1.
Rel1_N.O is connected to Rel1_A1 and Rel2_com
Rel1_N.C is connected to InT
Rel1_A1 is connected to Rel1_N.O and to Rel2_com
Rel2 is wired as such:
Rel2_com is connected to Rel1_N.O
Rel2_N.O is connected to InR
Rel2_N.C is connected to InS
Rel2_A1 is connected to InR In the event of loss of one or two of the phases, circuit switches a backup phase from the other existing phases for providing single life phase. Capacitor C1 is bridging Cmain_A1 and Cmain_A2 to protect Cmain as well as Rel1 and Rel2 from current spikes during switching events.

There are several scenarios relevant and possible:

Scenario A—At default when all phases and common neutral line function well
Rel2.N.C is disconnected
Rel2.N.O is connected
Rel1.N.C is disconnected
Rel1.N.O is connected
Power supply receives phase from R.

Scenario B—R line fails or missing—Rel2 switches due to the voltage drop as illustrated in FIG. 2-B While Rel1 does not.
Rel2.N.C is disconnected
Rel2.N.O is connected
Rel1.N.C is disconnected
Rel1.N.O is connected
Power supply receives phase from S.

Scenario C—R, S line fail, as illustrated in FIG. 2-C. Rel1 opens and switching is as such
Rel2.N.C is disconnected
Rel2.N.O is connected
Rel1.N.C is disconnected
Rel1.N.O is disconnected
Rel2 switches due to the voltage drop from Rel1 and Rel1 switches due to the voltage drop from R and S lines. Power supply is received from T line.

Figure 3:
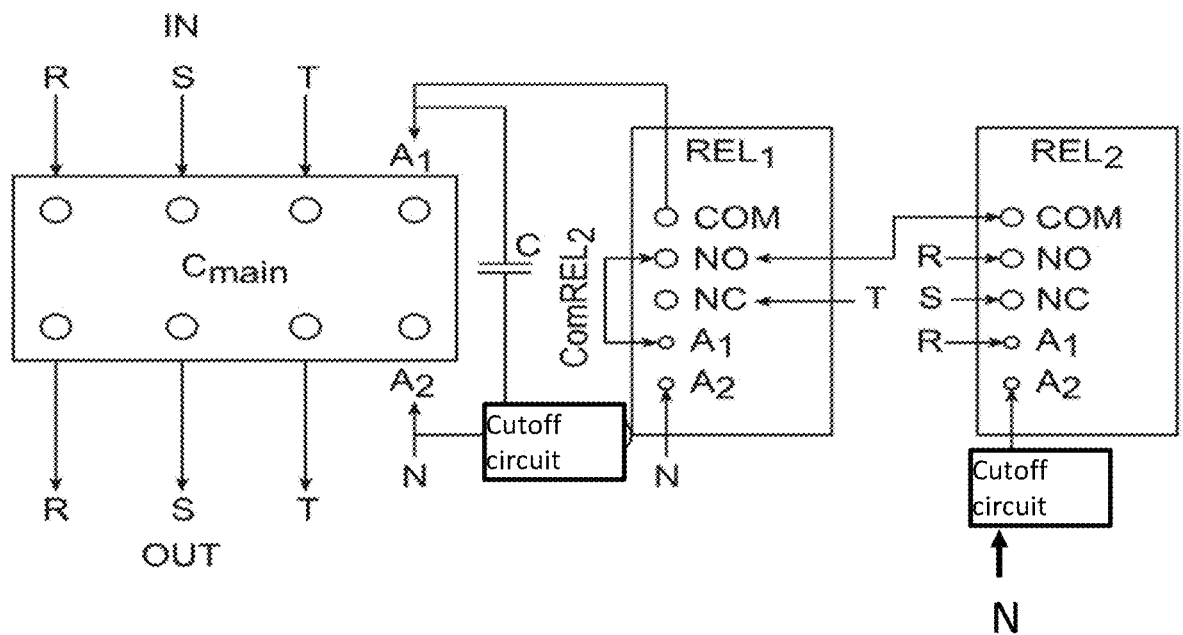
FIG. 3 is a schematic illustration of an alternative configuration of a sensing unit of the protection circuit including a contactor, two relays and a protection cutoff circuit, in accordance with an embodiment of the present invention.

FIG. 3 is a schematic illustration of a three-phase electrical power system including a phase control circuitry providing a single live phase from three-phase input, in accordance with an embodiment of the present invention. The control unit receives, as input, three-phase input power, typically with a four-wire configuration that includes a neutral line, as indicated in the figure. The phases of the three-phase power input are commonly labelled R, S, and T phases, respectively. The three-phase power input is typically provided by an electric generator, such as an on-site generator or a generator of a utility grid.

The control circuit includes two relays labelled Rel1, Rel2, Contactor Cmain, capacitor C1 and a Cutoff circuit CO1 as illustrated in FIG. 3. The phase inputs to Contactor Cmain are labelled as InR, InS and InT. The phase outputs from Contactor Cmain are labelled as OutR, OutS and OutT. The coil terminals are marked as Cmain_A1 and Cmain_A2. The common neutral line is marked N. The switching scenarios illustrated for FIG. 2 are pertinent also for FIG. 3 regarding the present invention. Capacitor C1 is bridging Cmain_A1 and Cmain_A2 to protect Cmain as well as Rel1 and Rel2 from current spikes during switching events. The Cutoff circuit CO1 is bridging Rel1 to Cmain between points Cmain_A2 and Rel1_A2 to provide protection as well as a signal in case of over-voltages and under-voltages.

Cutoff example circuit allows voltage at prescribed limits. Voltage fluctuations in electric power supply certainly have adverse effects on connected loads. These fluctuations can be caused by several reasons like voltage surges, overload, lightning, etc. Over-voltages may cause insulation damage leading to short circuits while under-voltage causes overloading of the equipment leading to inefficient performance.

Figure 4:
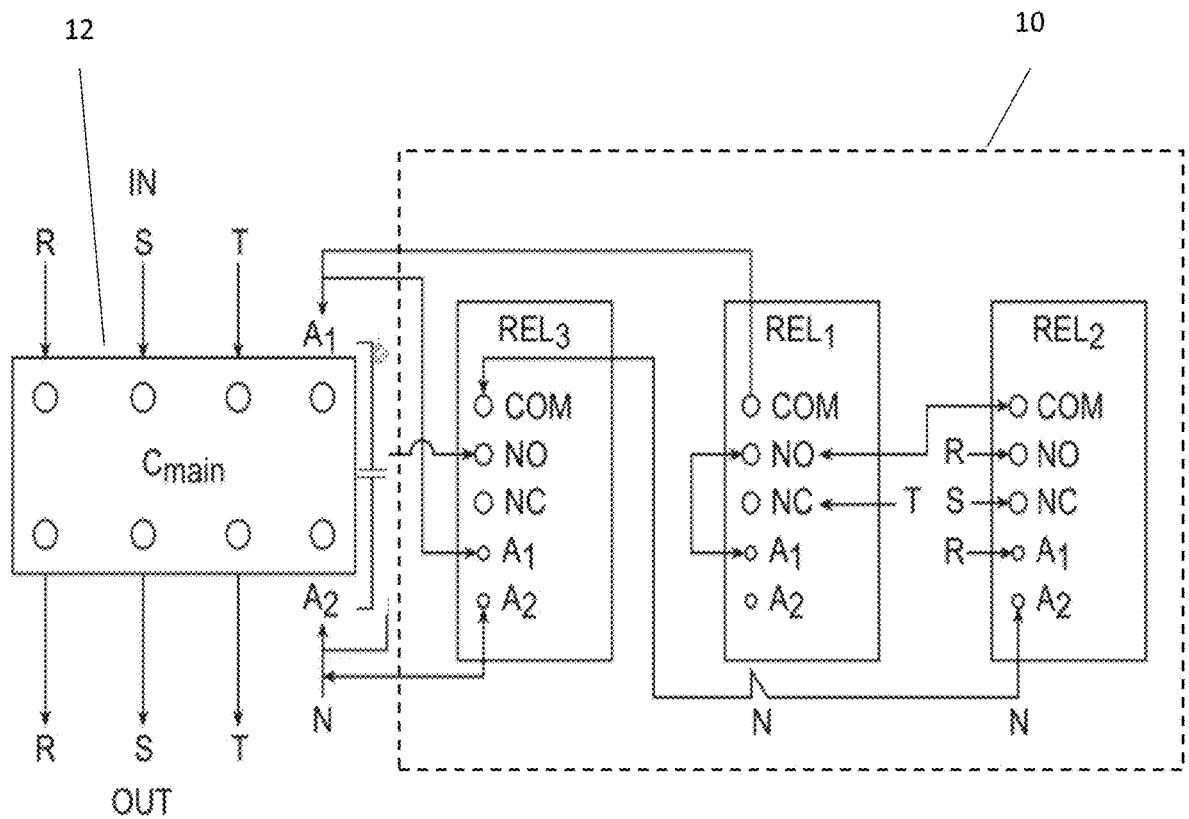
FIG. 4 is a schematic illustration of a three-phase protection circuit including a contactor and three relays in accordance with an embodiment of the present invention.

FIG. 4 is a schematic illustration of a three-phase electrical power system including a phase control circuitry providing single live phase from three phase input, in accordance with an embodiment of the present invention. The control circuit receives, as input, three-phase input power, typically with a four-wire configuration that includes a neutral line, as indicated in the FIG. 1. The phases of the three-phase power input are commonly labelled R, S, and T phases, respectively. The three-phase power input is typically provided by an electric generator, such as an on-site generator or a generator of a utility grid.

The control circuit includes three relays labelled Rel1, Rel2, Rel3 and Contactor Cmain. The phase inputs to Contactor Cmain are labelled as InR, InS and InT. The phase outputs from Contactor Cmain are labelled as OutR, OutS and OutT. The coil terminals are marked as Cmain_A1 and Cmain_A2. Relay terminals are marked as Rel1_A1, Rel2_A1, Rel3_A1 and Rel1_A2, Rel2_A2, Rel3_A2 as illustrated in FIG. 4. The common neutral line is marked N.

This configuration provides:

Cmain_A2, Rel1_A2, Rel2_A2 and Rel3_A2 are connected to common N.

Rel1_A1, Rel2_A1 and Rel3_A1 are fed by phase R.

All terminals A1 are connected to a protection capacitor which is bridging to Common N.

There are several scenarios relevant and possible:

Scenario A: When Phase R fails Rel1_N.C connects with Rel3_com

Rel2_N.C feeds Rel3_A1 by S phase which transfers power to Rel3_com back to Rel1_N.C Scenario B: When phases R and S are missing, Rel3_N.C transfers phase T to terminal Rel1_N.C and from there to terminal Cmain_A1.

Figure 5:
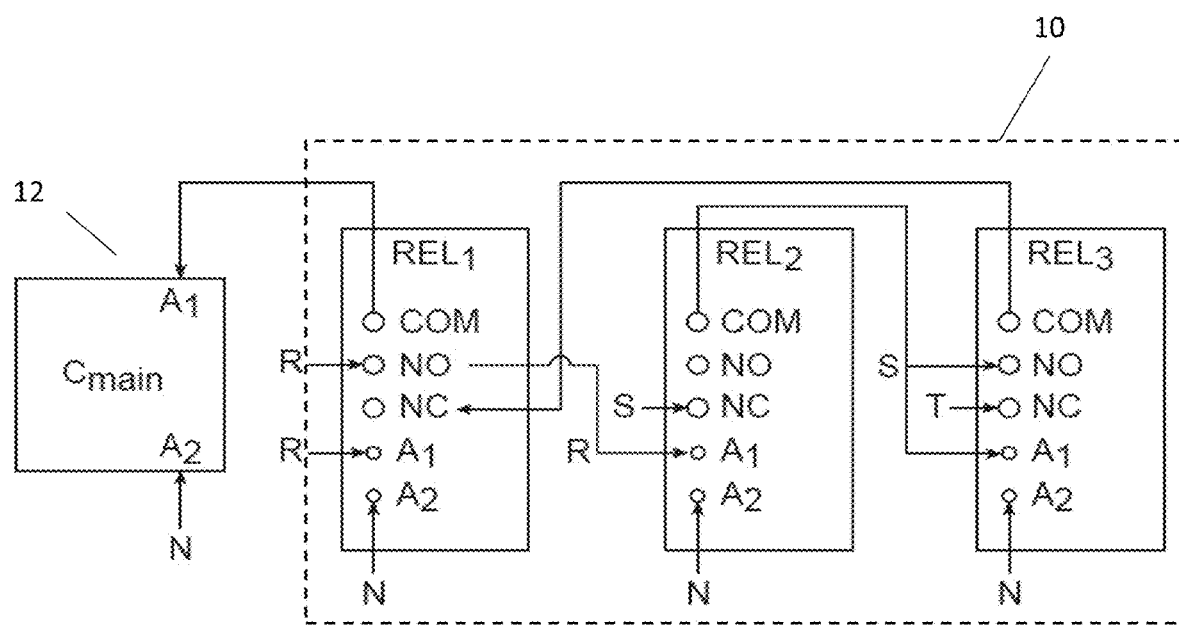
FIG. 5 is a schematic illustration of an alternative configuration of a three-phase protection circuit including a contactor and three relays in accordance with an embodiment of the present invention.

FIG. 5 is a schematic illustration of an alternative three-phase electrical power system including a phase control circuitry providing a single live phase from three phase input, in accordance with an embodiment of the present invention. The control circuit receives, as input, three-phase input power, typically with a four-wire configuration that includes a neutral line, as indicated in the figure. The phases of the three-phase power input are commonly labelled R, S, and T phases, respectively. The three-phase power input is typically provided by an electric generator, such as an on-site generator or a generator of a utility grid.

Figure 6:
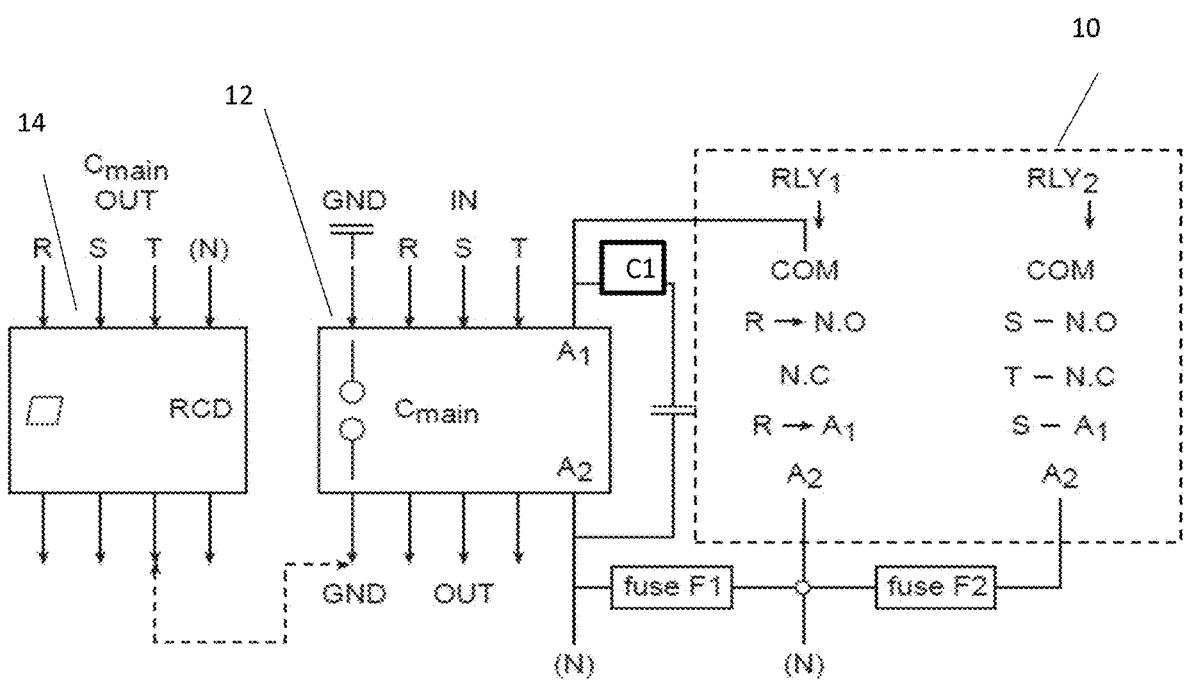
FIG. 6 is a schematic illustration of a three-phase protection circuit including a contactor two relays, a fuse and a residual-current device in accordance with an embodiment of the present invention.

FIG. 6 is a schematic illustration of a three-phase electrical power system including a control circuit including contactor two relays, a fuse and a residual-current device in accordance with an embodiment of the present invention.

In embodiments of the present invention, as presented in FIG. 6, the control circuit 10 includes two relays labelled Rel1, Rel2, Contactor labeled Cmain, fuE f1, fuse F2 and residual-current device labelled RCD. The phase inputs to Contactor Cmain are labelled as InR, InS and InT. The phase outputs from Contactor Cmain are labelled as OutR, OutS and OutT. A ground terminal is labelled Cmain_GND. Control ("coil") terminals are marked as Cmain_A1 and Cmain_A2. Relay terminals are marked as Rel1_A1, Rel2_A1 and Rel1_A2, Rel2_A2 as illustrated in FIG. 5. The common neutral line is marked N. The phases from RCD are labeled as RCD_R, RCD_S and RCD_T respectively as illustrated in FIG. 5.

Figure 7:
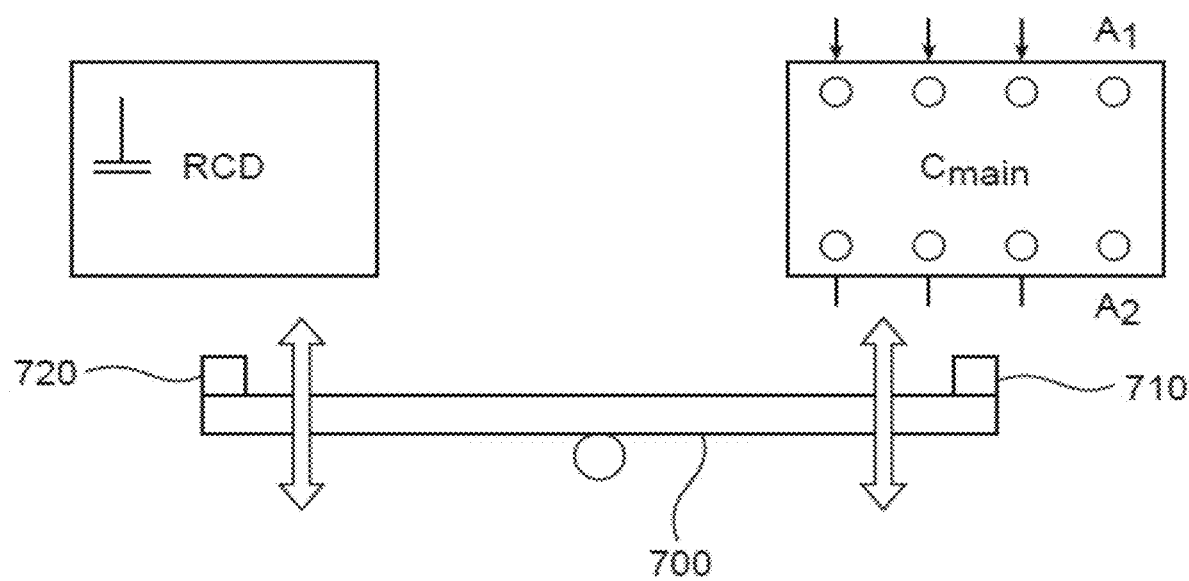
FIG. 7 is a schematic illustration of integrating between a contactor and the residual-current device, in accordance with an embodiment of the present invention.

Residual-current device (RCD) is connected to contactor Cmain in a feedback loop as illustrated in FIG. 7 where one of the phases RCD_R, RCD_S or RCD_T are bridged to Cmain_GND. In the event of lack of common N, Cmain_N.C will disconnect, shutting off contactor Cmain One of the phases RCD_R, RCD_S or RCD_T will close a circuit with Cmain_GND.

FIG. 7 is a schematic illustration of integrating between the contactor and the residual-current device, in accordance with an embodiment of the present invention.

The integration is achieved by a swinging device 700 having to contact point 710 and 720, in case the contactor is activated, the contact point 710 is pulled downwards, and contact point 720 is pushed upwards activating the RCD unit.

Figure 8:
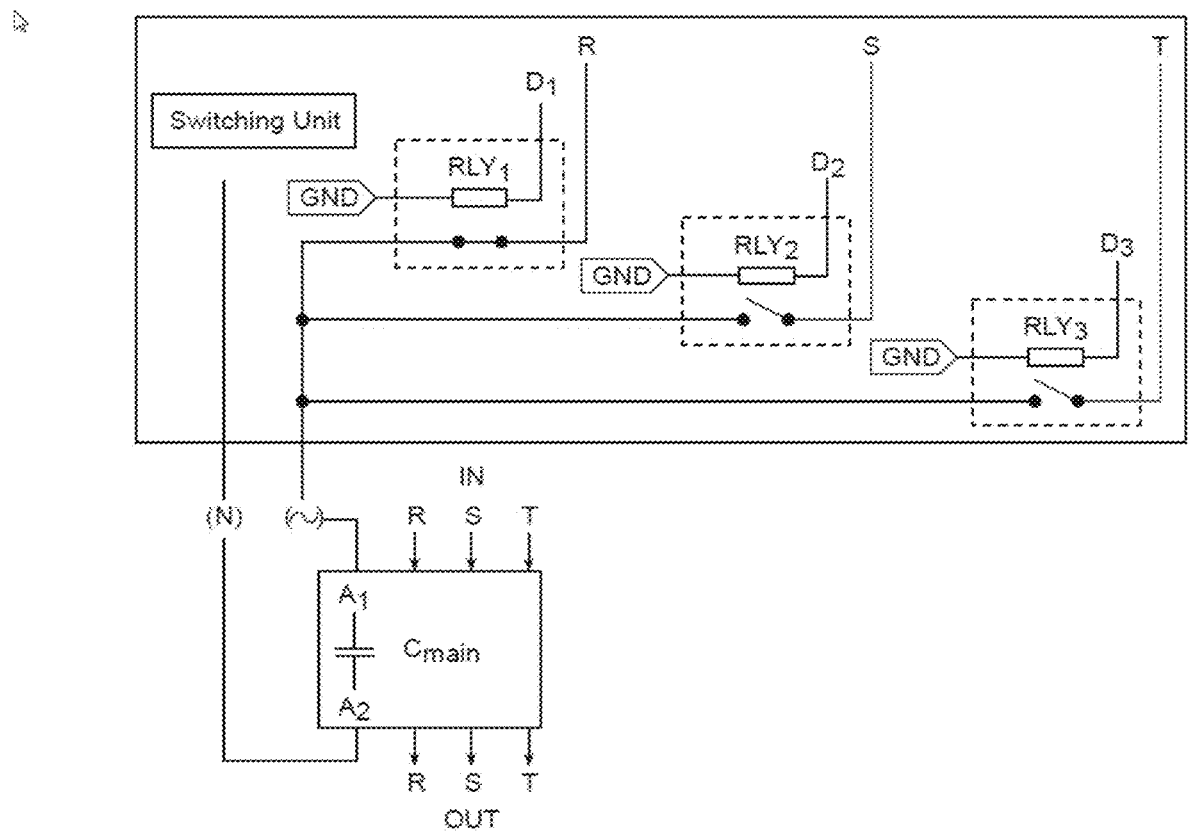
FIG. 8 is a schematic illustration of a switching unit of a three-phase electrical power system providing one phase to a contactor (Cmain), in accordance with an embodiment of the present invention.

FIG. 8 is a schematic illustration of a switching unit of a three-phase electrical power system providing one phase for main contactor (Cmain), in accordance with an embodiment of the present invention.

The switching unit in FIG. 8 is a detailed view of the switching unit in FIG. 9. The switching unit includes three relays Rel1, Rel2, Rel3 which receive their DC power through terminal D1, D2, D3 respectively. Contactor Cmain terminal Cmain_A2 is connected to common N through the switching unit. The switching unit is connected to contactor Cmain terminal Cmain_A1.

In the event where phase R drops or experiences spikes or other supply problems, relays Rel2 or Rel3 will switch on so that phase S or T respectively will compensate the phase for terminal A1. The same event is pertinent for either one of the relays Rel1, Rel2 or Rel3 when one of the phases drops.

Figure 9A:
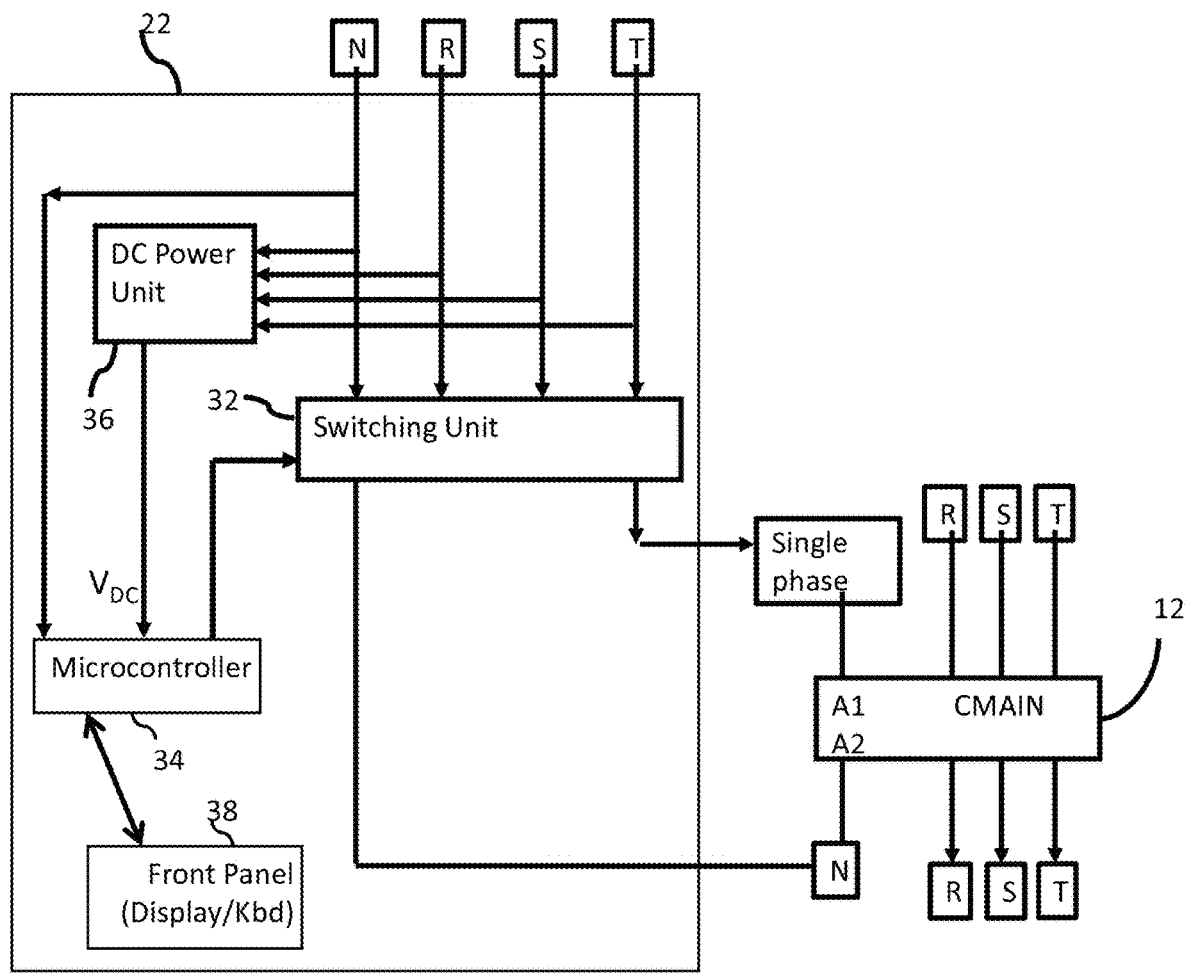
FIG. 9A is a schematic illustration of a three-phase electrical power system comprising a DC power unit, a switching unit and a micro controller providing a one phase control line to a Cmain circuit, in accordance with an embodiment of the present invention.

FIG. 9A is a schematic illustration of a three-phase electrical power system comprising control circuit 22 comprised of DC power unit, switching unit and micro controller 34 providing one phase to Cmain contractor 10, in accordance with an embodiment of the present invention;

As illustrated in FIG. 9A, the switching unit 32 is controlled by the microcontroller 34A where front panel 38 provides indication to the user and it receives DC power from DC power unit 36.

The control circuit 22 provide single live phase to Cmain contractor 12 at point A1.

In case of neutral failure, the Cmain is in disconnection state, protecting the output of the three phases, by disconnecting all three phases.

Figure 9B:
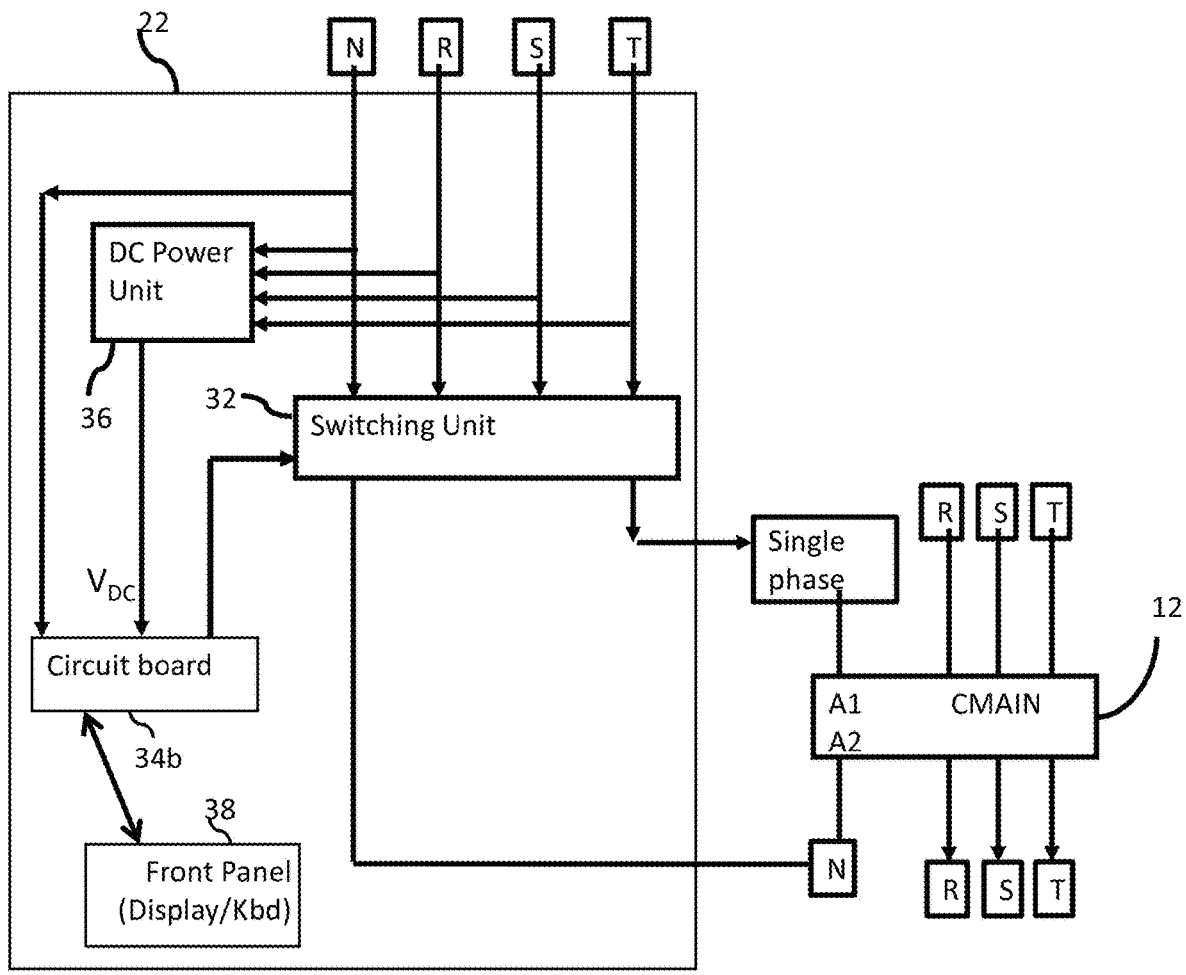
FIG. 9B is a schematic illustration of a three-phase electrical power system comprising a DC power unit, a switching unit and a circuit board providing a one phase control line to a Cmain circuit, in accordance with an embodiment of the present invention.

FIG. 9B is a schematic illustration of a three-phase electrical power system comprising control circuit 22 comprised OF: DC power unit 36, switching unit 32 and Circuit board 34b providing a single live phase to Cmain circuit, in accordance with an embodiment of the present invention;

As illustrated in FIG. 9B, the switching unit 32 is working based on output the circuit board 34B where front panel 38 provides indication to the user and it receives DC power from DC power unit 36.

The control circuit 22 provides a single live phase to Cmain contractor 12 at point A1.

In case of neutral failure, the Cmain is in disconnection state, protecting the output of the three phases, by disconnecting all three phases.

Figure 10:
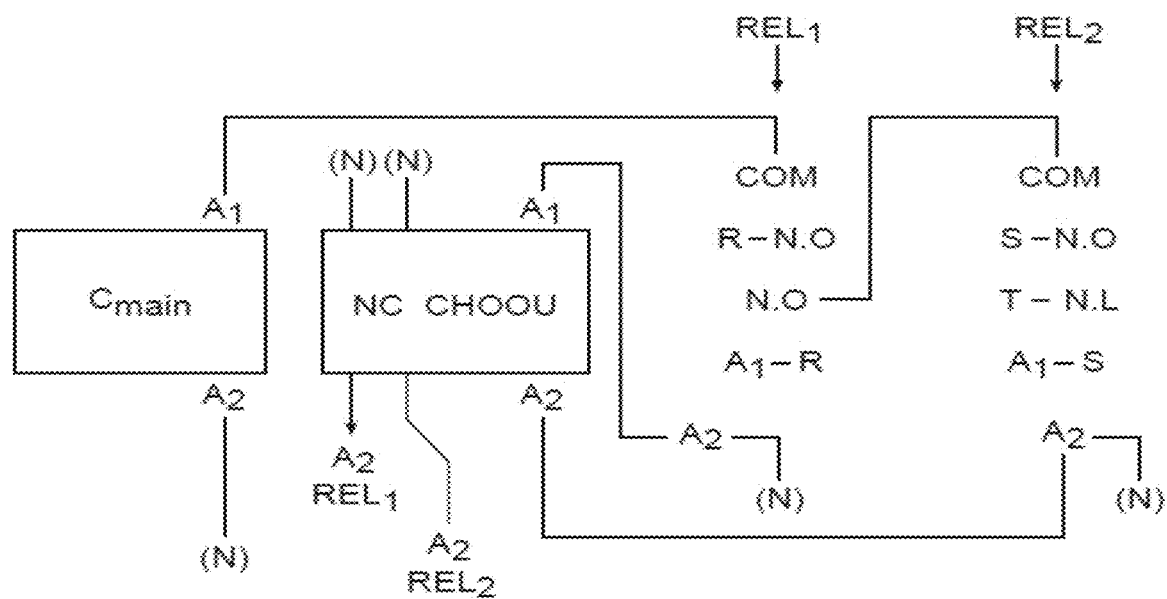
FIG. 10 is a schematic illustration of a three-phase electrical power system including a control circuit 10 comprised of two relays and a main contactor 12, typically a 400V contactor, in accordance with an embodiment of the present invention.

FIG. 10 is a schematic illustration of a three-phase electrical power system including a control circuit 10 comprised of two relays a main contactor 12, typically a 400V contactor, in accordance with an embodiment of the present invention.

This configuration protects the relays in case of neutral loss. The control voltage of the contactor is typically 400V. In case of neutral loss, phase R is directed through A2in to A2 of the contactor. When two phases are working, the contactor is activated and the normally closed circuits are open, hence the voltage is not directed through the contacts of Rel2 and Rel2 has protection.

Figure 11:
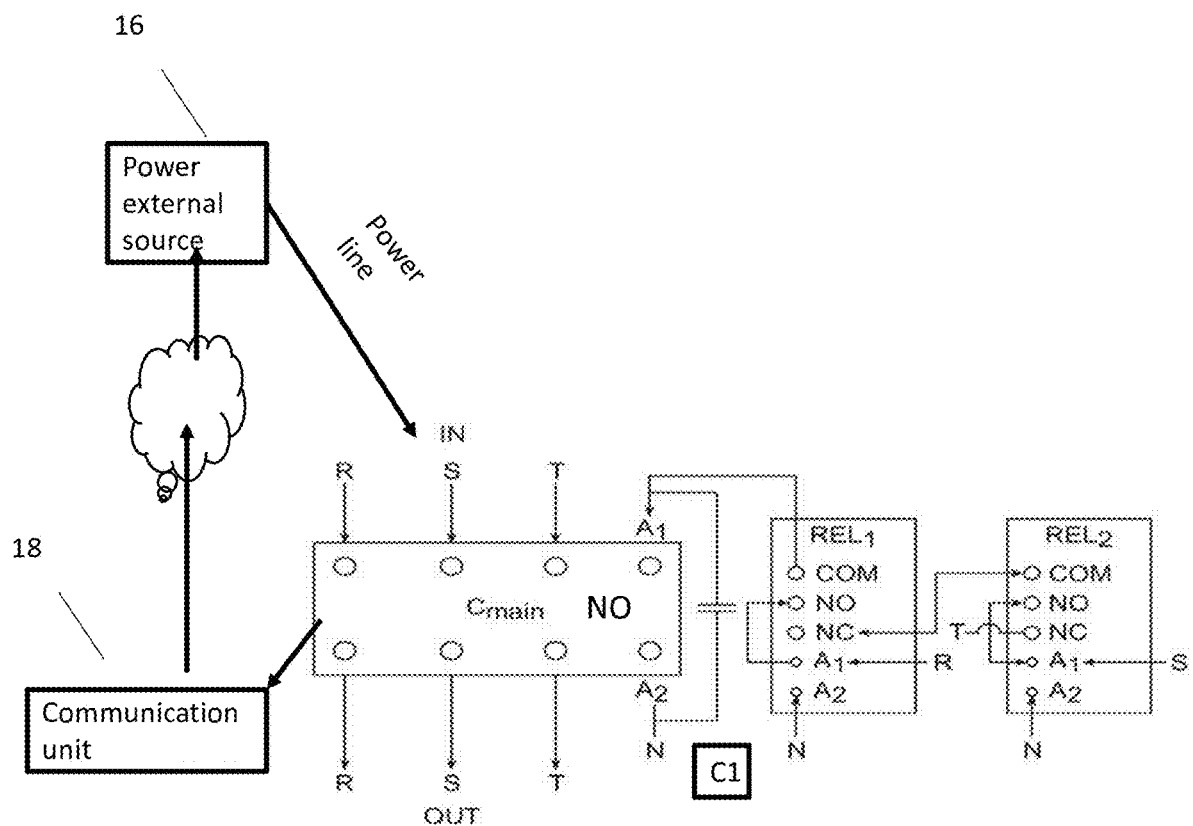
FIG. 11 is a schematic illustration of a three-phase electrical power system protection circuit, according to some embodiments of the present invention.

FIG. 11 is a schematic illustration of a three-phase electrical power system including a neutral loss detection circuit and its wirings. The control circuit 10 receives, as input, three-phase input power, typically with a four-wire configuration that includes a neutral line, as indicated in the figure. The phases of the three-phase power input are commonly labelled R, S, and T phases, respectively. The three-phase power input is typically provided by an electric generator, such as an on-site generator or a generator of a utility grid. Also provided with the three phases, in normal operation, is a neutral line, indicated as N.

The control unit is communication wireless or wireless to communication unit 20, the communication unit can be implemented as router for connecting the internet, an IOT device or cellular communication device having SIM card for communication through communication network such as the internet or cellular network to the facilities of the external energy source 10, such as an electric power/distribution company. This communication configuration enable the electricity power company to receive real time notification, of neutral failure is different sites.

Figure 12:
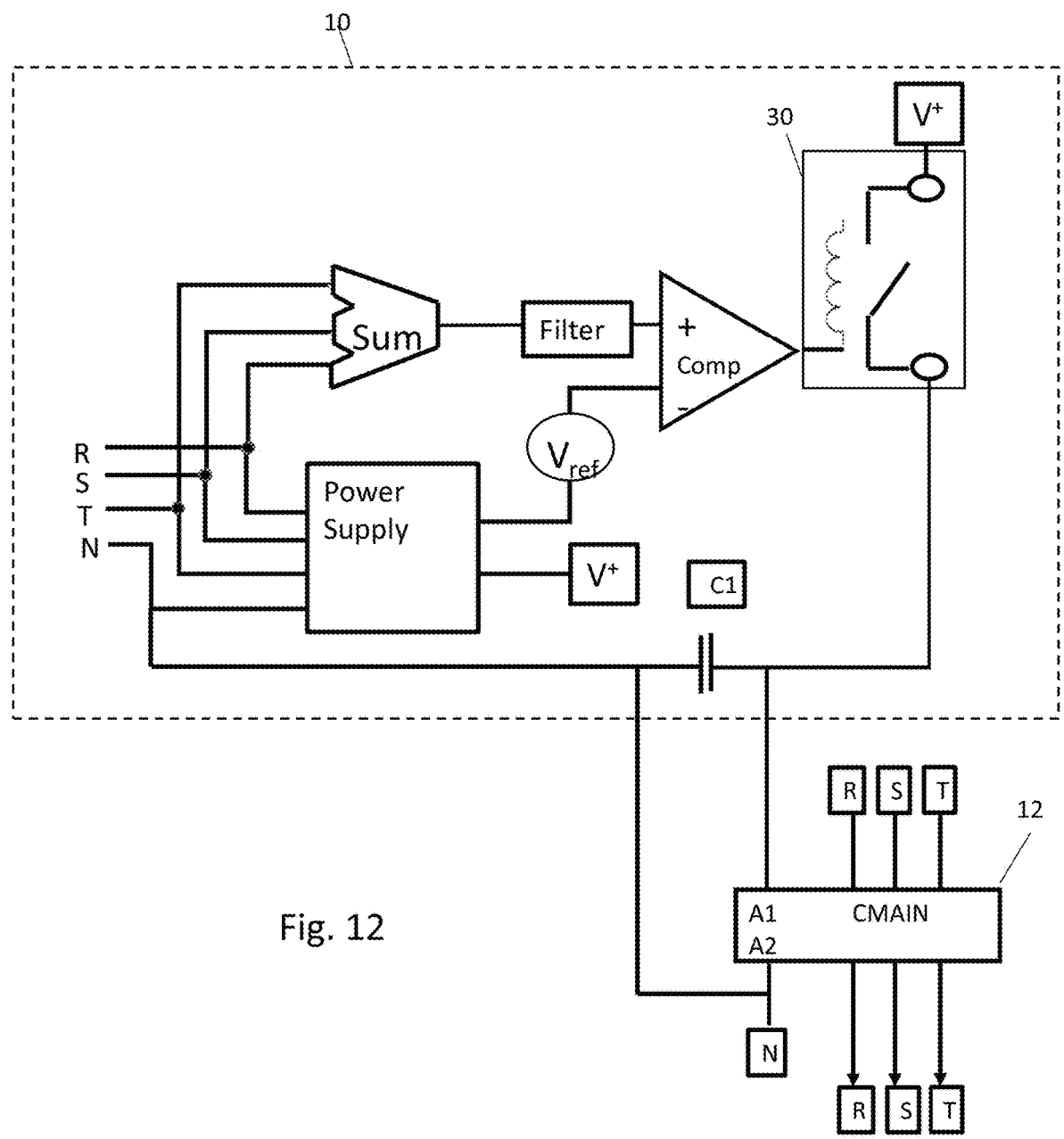
FIG. 12 is a schematic block diagram of a three-phase protection circuit including elements for summing the three phases, a filter circuit, and a comparison circuit for outputting a single active output phase, in accordance with an embodiment of the present invention.

FIG. 12 is a schematic block diagram of a three-phase protection circuit including elements for summing the three phases, a filter circuit, and a comparison circuit for outputting a single active output voltage, in accordance with an embodiment of the present invention. The summing circuit provides a voltage average of the three phases, and the filter circuit removes an AC component from the voltage average to provide a DC voltage average. A power supply provides a reference voltage, which the comparison circuit compares to the DC voltage average. If the comparison is not equal, which occurs when the neutral is floating, an output relay 30 is opened, thereby disconnecting the control line of the Cmain contactor. If the neutral line is not floating, the DC voltage average is equal to the reference voltage, and the Cmain control line keeps the contactor operating. Capacitor C1 within the control unit is bridging Cmain_A1 and neutral line to protect Cmain as well as the control circuit from current spikes during switching events.

Figure 13:
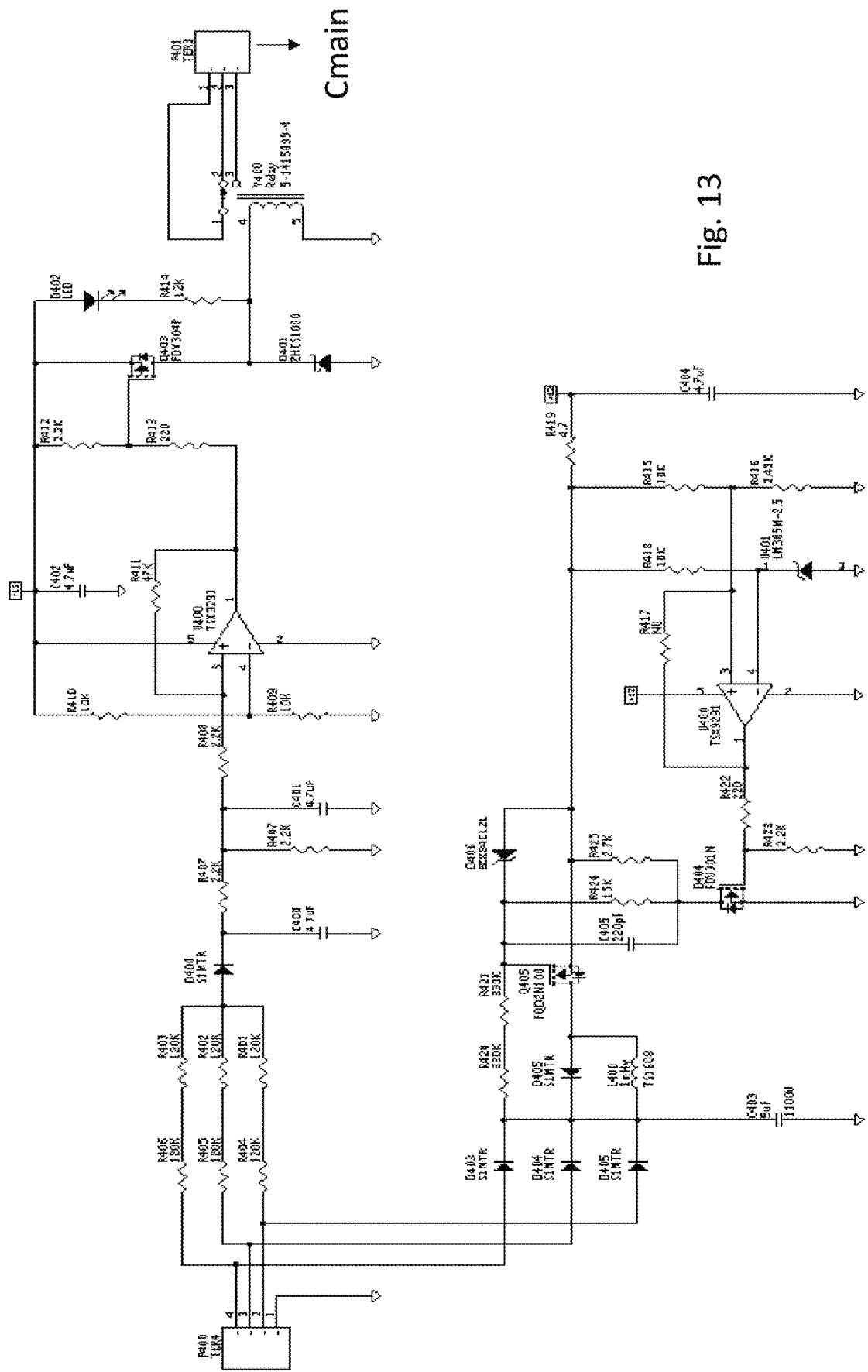
FIG. 13 is a schematic, detailed illustration of the three-phase protection circuit of FIG. 12, in accordance with an embodiment of the present invention.

FIG. 13 is a schematic, detailed illustration of the three-phase protection circuit of FIG. 12, in accordance with an embodiment of the present invention. The detailed illustration shows exemplary electrical components of each of the blocks of the FIG. 12 illustration.

The system of the present invention may be integrated for example in houses, ships, airplanes, etc. or in any system receiving a three-phase power source. It will be appreciated that the system of the present invention may be connected to any three-phase power source such as an electric company, a three-phase generator, or any other three-phase power source.

In case A1 in Cmain receives at least one phase, S, R or T, and A2 receive N, the Cmain is closed (connected state) and all three phases can work regularly. In case of neutral failure, the Cmain is in disconnection state, protecting the output of the three phases, by disconnecting all three phases.

It will be appreciated that in cases in which one or two of the three phases malfunction, the loads may require more power than the working phase(s) can supply. In such situations, a three-phase circuit breaker will typically break the electrical circuit due to an overload. The alert at the front panel may notify a user of a pending overload before the circuit breaker is activated, so that the user may disconnect electric appliances, enabling the working phase(s) to supply the user's needs.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. Digital Signal Processor (DSP), Microcontrollers, Field Programmable Gate Array (FPGA), Application Specific Integrated Circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (Read Only Memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A protection circuit providing a control voltage to a 3-phase contactor the protection circuit comprising:
   four input terminals, configured to be connected respectively to three phases and to the neutral line of the 3-phase power supply, wherein the three phases of the 3-phase power supply are inputs to the 3-phase contactor;
   an output terminal, providing the control voltage to a control line of the 3-phase contactor; and
   a control circuit configured to provide the control voltage to the control line when any one or more of the three phases are live and when the neutral line is connected, and to provide no control voltage when the neutral line is floating
   wherein the control circuit is comprised of: at least two cross-connected relays, wherein each relay includes at least one normally open connection and at least one normally close connection, and wherein the output of the at least two cross-connected relays provides a single phase voltage as the control voltage when any one of the three phases is disconnected.

2. The protection circuit of claim 1, wherein the protection circuit further comprise at least one fuse connecting between the contactor and at least one relay.

3. The protection circuit of claim 1, wherein the control circuit further comprise a third relay circuit.

4. The protection circuit of claim 1, wherein the control circuit further comprise residual-current device Residual-current device (RCD) is connected to the 3-phase contactor in a feedback loop where one of the phases RCD_R, RCD_S or RCD_T are bridged to the 3-phase contactor.

5. The protection circuit of claim 1 further comprising a communication unit to sending indication of neutral loss to a power electricity facility.

6. A protection circuit connecting three loads to three respective phases of a 3-phase power supply comprises:
   four input terminals, configured to be connected respectively to the three phases and to the neutral line of the 3-phase power supply;
   a three-phase contactor, having a control line and three input terminals connected to the three phases of the 3-phase power supply; and
   a control circuit configured to provide a control voltage to the control line when any one or more of the three phases are live and when the neutral line is connected, and to provide no control voltage when the neutral line is floating
   wherein the control circuit is comprised of: at least two cross-connected relays, wherein each relay includes at least one normally open connection and at least one normally close connection, and wherein the output of the at least two cross-connected relays provides a single phase voltage as the control voltage when any one of the three phases is disconnected.

7. The protection circuit of claim 6, wherein the protection circuit further comprise at least one fuse connecting between the contactor and at least one relay.

8. The protection circuit of claim 6, wherein the protection circuit further comprise at least one cutoff circuit which is bridging at least one relay to the contactor between the contactor and one relay to provide protection in case of over-voltages or under-voltages.

9. The protection circuit of claim 6 wherein the control circuit is comprised of DC power unit, switching unit and micro controller providing one phase to Cmain circuit.

10. A protection circuit providing a control voltage to a 3-phase contactor the protection circuit comprising:
- four input terminals, configured to be connected respectively to three phases and to the neutral line of the 3-phase power supply, wherein the three phases of the 3-phase power supply are inputs to the 3-phase contactor;
- an output terminal, providing the control voltage to a control line of the 3-phase contactor; and
- a control circuit configured to provide the control voltage to the control line when any one or more of the three phases are live and when the neutral line is connected, and to provide no control voltage when the neutral line is floating;
- wherein the control circuit is comprised of elements including a summing circuit providing a voltage average of the three phases, a filter circuit, a power supply providing a reference voltage, and a comparison circuit comparing the reference voltage to the voltage average.

11. A protection circuit providing a control voltage to a 3-phase contactor the protection circuit comprising:
- four input terminals, configured to be connected respectively to three phases and to the neutral line of the 3-phase power supply, wherein the three phases of the 3-phase power supply are inputs to the 3-phase contactor;
- an output terminal, providing the control voltage to a control line of the 3-phase contactor; and
- a control circuit configured to provide the control voltage to the control line when any one or more of the three phases are live and when the neutral line is connected, and to provide no control voltage when the neutral line is floating;
- wherein the protection circuit further comprise at least one cutoff circuit which is bridging at least one relay to the contactor between the contactor and one relay to provide protection in case of over-voltages or under-voltages.

12. A protection circuit providing a control voltage to a 3-phase contactor the protection circuit comprising:
- four input terminals, configured to be connected respectively to three phases and to the neutral line of the 3-phase power supply, wherein the three phases of the 3-phase power supply are inputs to the 3-phase contactor;
- an output terminal, providing the control voltage to a control line of the 3-phase contactor; and
- a control circuit configured to provide the control voltage to the control line when any one or more of the three phases are live and when the neutral line is connected, and to provide no control voltage when the neutral line is floating;
- wherein the control circuit is comprised of DC power unit, switching unit and micro controller providing one phase to Cmain circuit.

13. A protection circuit connecting three loads to three respective phases of a 3-phase power supply comprises:
- four input terminals, configured to be connected respectively to the three phases and to the neutral line of the 3-phase power supply;
- a three-phase contactor, having a control line and three input terminals connected to the three phases of the 3-phase power supply; and
- a control circuit configured to provide a control voltage to the control line when any one or more of the three phases are live and when the neutral line is connected, and to provide no control voltage when the neutral line is floating;
- wherein the control circuit is comprised of elements including a summing circuit providing a voltage average of the three phases, a filter circuit, a power supply providing a reference voltage, and a comparison circuit comparing the reference voltage to the voltage average.

14. A protection circuit connecting three loads to three respective phases of a 3-phase power supply comprises:
- four input terminals, configured to be connected respectively to the three phases and to the neutral line of the 3-phase power supply;
- a three-phase contactor, having a control line and three input terminals connected to the three phases of the 3-phase power supply; and
- a control circuit configured to provide a control voltage to the control line when any one or more of the three phases are live and when the neutral line is connected, and to provide no control voltage when the neutral line is floating;
- wherein the control circuit is comprised of DC power unit, switching unit and micro controller providing one phase to Cmain circuit.

* * * * *